July 25, 1967     E. A. FOSTER     3,332,195
POLE FRAMES

Filed Sept. 29, 1964     4 Sheets-Sheet 1

INVENTOR
ELLERY A. FOSTER
BY Frederick W. Turnbull
ATTORNEY

July 25, 1967  E. A. FOSTER  3,332,195
POLE FRAMES
Filed Sept. 29, 1964  4 Sheets-Sheet 2

INVENTOR
ELLERY A. FOSTER
BY *Frederick W. Turnbull*
ATTORNEY

July 25, 1967  E. A. FOSTER  3,332,195
POLE FRAMES

Filed Sept. 29, 1964  4 Sheets-Sheet 3

INVENTOR
ELLERY A. FOSTER
Frederick W. Turnbull
BY
ATTORNEY

July 25, 1967  E. A. FOSTER  3,332,195
POLE FRAMES
Filed Sept. 29, 1964  4 Sheets-Sheet 4

INVENTOR
ELLERY A. FOSTER
BY Frederick W Turnbull
ATTORNEY

United States Patent Office 3,332,195
Patented July 25, 1967

3,332,195
POLE FRAMES
Ellery A. Foster, 6205 E. Halbert Road,
Bethesda, Md. 20034
Filed Sept. 29, 1964, Ser. No. 399,995
7 Claims. (Cl. 52—646)

ABSTRACT OF THE DISCLOSURE

A pole having attaching means at each end to secure a second identical pole to it at an angle of 60° and to be in turn secured by the attaching means of an identical pole at an angle of 60° to said second pole. Since the planes in which two said poles lie at their 60° angle may intersect the plane at which other identical poles secured to said pole, and said second pole, a plurality of the identical poles with their attaching means can be assembled into frame words as shown in the drawing.

The present invention relates to pole frames and to the poles and appropriate fittings from which frames may be assembled. Frames for such devices as domed structures made of elongated elements with fixtures at their ends are known in the art, and trusses formed of elongated components with special fixtures are also known. The devices of this present invention, however, provides for a framework or truss to be formed of a plurality of identical novel elements of very simple structure that may be readily transported and easily assembled in the field, requiring only a wrench for assembly.

The elements of the present invention may be assembled in various ways, as will be explained in the following specification, to form such devices as shelters, towers, bridges, trusses, or the like.

It is an object of the present invention, therefore, to provide a knockdown framework formed of a plurality of identical elements.

It is a further object of the invention to provide a plurality of identical elements which may be assembled variously to form such devices as a shelter, a tower, a bridge or other form of truss.

Other and further objects and advantages of the present invention will appear from the following specification taken with the drawing in which like reference characters are used to denote similar elements in the several views and in which.

Figure 1:
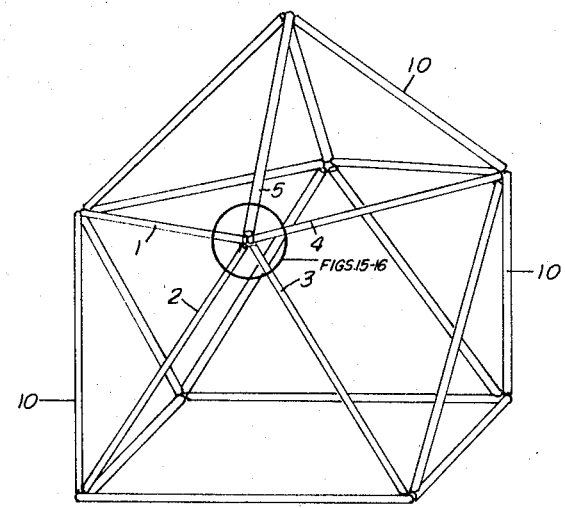
FIGURE 1 is a perspective view of a four-sided shelter-frame formed in accordance with the present invention.

The assemblage of FIGURE 1 is based on a square and has a peaked roof. Plastic or the like, to form a shelter may be placed over the frame to be used in lieu of a tent of conventional form, or the covered frame may be used as a protecting cover for plants and the like.

It is immediately apparent that a plant, such as an orange tree, located in an area where there are frosts, could easily be protected by enclosing it within a frame such as that of FIGURE 1, covering the frame with sheet plastic material or the like, and providing a heating means within the confines of the frame. It is proposed that frame elements 10 be of a standard and uniform length, an eight-foot length being suggested. A frame such as in FIGURE 1 requires 20 such elements.

Figure 15:
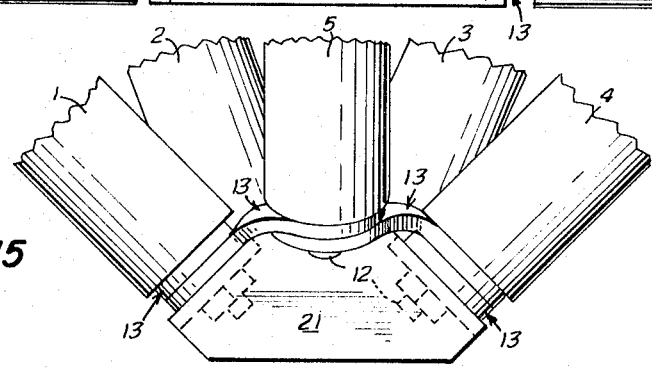
FIGURES 15 and 16 are a plan and an elevation, respectively, of the joint encircled in FIGURE 1.
Figure 16:
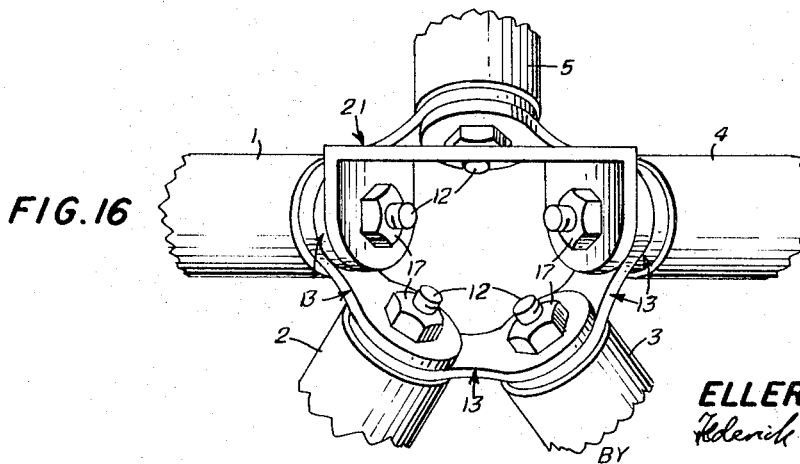

In order to facilitate understanding of the method of assembling these devices from a plurality of identical structural elements and the utility of the individual elements, it is desirable to study FIGURES 15 and 16, taken with the encircled joint in FIGURE 1, but in order to study these figures, it is first necessary to understand precisely the nature of each of the structural elements as illustrated in FIGURES 5, 6, 7 and 8.

Figure 5:
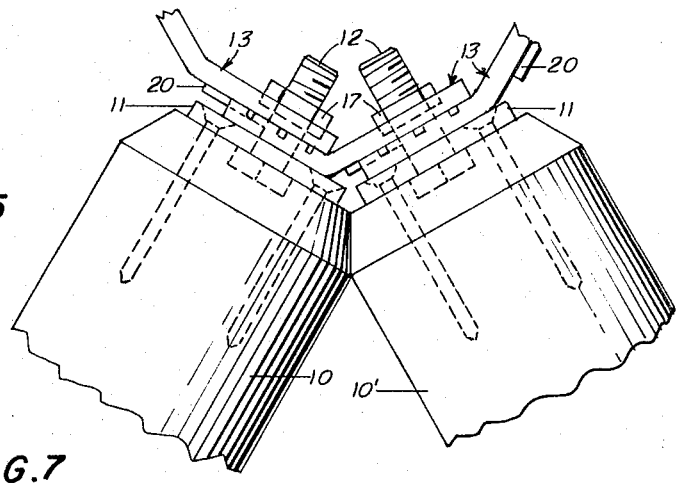
FIGURE 5 is a fragmentary elevation of the ends of two elements of the present invention secured together.
Figure 7:
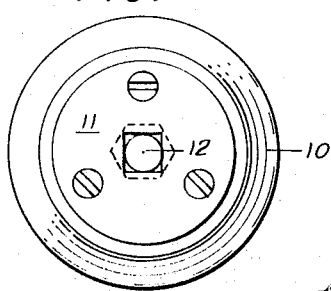
FIGURE 7 is an end view of one of the pole elements with the element of FIGURE 6 removed.

FIGURE 5 shows the ends of two elongated members shown as being wooden poles 10 and 10' which are secured together in the position that they will occupy with respect to each other in whatever structure they may be used, each pole 10 and 10' has secured to its end a plate 11, from which a bolt end 12 extends axially of the pole. Each end of each pole is similarly provided with such a plate 11 and extending bolt 12. The connecting or securing element 13 is mounted upon each axially extending bolt so that the bolt extends through the aperture 14 seen in the left-hand end of the element 13 in FIGURE 6. It will be seen then that a pole 10 having a coaxial bolt 12 extending from each end, and a securing element 13 retained on each bolt by a retaining and tightening means such as nut 17 constitutes one of the structural elements. Element 13 has two ends connected by a portion 15, preferably of reduced width and bent to an obtuse angle of 120° to present a securing surface to receive the end of an identical element 10, or 10'. The word "bent" as used herein does not refer to a method of manufacture of the element, but rather it refers to the configuration of the element 13 of which the two apertured ends lie in planes intersecting each other at an obtuse angle of 120°.

As seen in FIGURE 5, a pole 10', having its bolt 12 extending through the notch 16 of the element 13 mounted on pole 10, and secured thereto by running the nut 17 tight against the surface 18 of the element 13, will be held at an angle of 60° with respect to pole 10. The surface 18 of the element 13 is shown as slightly depressed. While this is desirable in order to prevent accidental release of the element 13 from the pole 10 to which it is secured, it is not essential and while the notch 16 is used as a convenience to facilitate assembly of the devices, it would be possible to use a simple aperture similar to aperture 14 as seen at the other end of element 13.

Figure 6:
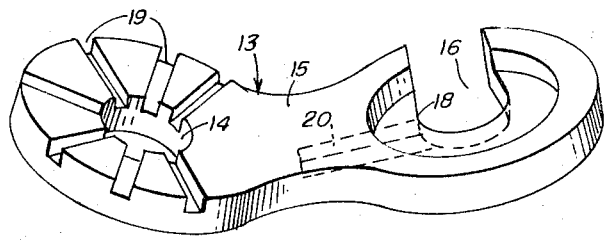
FIGURE 6 is a detail perspective of an element of the present invention.
Figure 8:
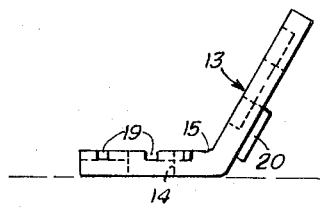
FIGURE 8 is an elevation of the element shown in FIGURE 6.

Referring again to FIGURE 5 we see that the pole 10 is connected to a pole 10' by element 13 which is illustrated in FIGURES 6 and 8. The aperture 14 is fitted over the bolt 12 of pole 10 and the bend at 15 of the element 13 is such that the notch 16 will engage over bolt 12 of pole 10' to lie flat against the element 13 which is already in place in pole 10'. Similarly, an element 13 from another pole, not shown, overlies the end of the element 13 which is already mounted on pole 10. If, however, no other pole is secured to pole 10 of FIGURE 5, nut 17 would be tightened against element 13 of pole 10.

Referring again to FIGURES 6 and 8, we see that the left-hand end adjacent aperture 14 is provided with radially arranged depressions or grooves 19 and the other end of the element 13 is provided in each case adjacent notch 16 with at least one projection or lug 20. When the elements are secured together the projection 20 of one element 13 will extend into a depression or groove 19 of the element 13 on the adjacent pole. While provision of this interlock between superimposed elements 13 is not an essential part of the invention, it is highly desirable since in making the several joints, as will be seen below, pivoting of the elements 13 relative to each other would provide a degree of instability of the resulting structure. The number and angularity of grooves 19 with respect to the plane through the axes of apertures 14 and 16 shown in FIGURE 6 is illustrative and not restrictive, the required number being readily ascertainable by geometrical procedures.

Figure 12:
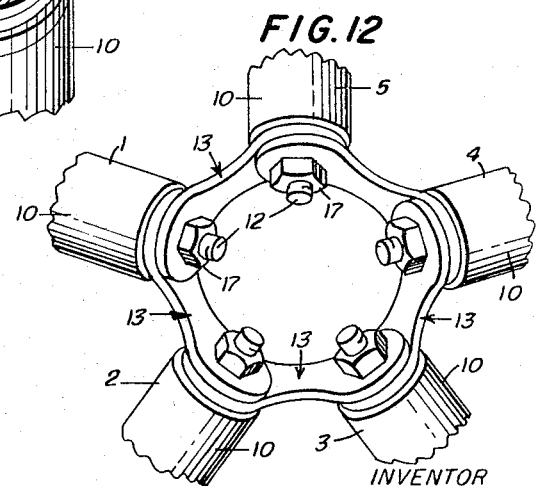

It will be noted that in every case, each pole is at a 60° angle to each adjacent pole to which it is secured by means of the elements 13. Referring to FIGURE 12, we can see that if five poles numbered 1, 2, 3, 4, 5, are connected together at their upper ends in a closed pattern, and they are arranged so that the distant ends of each pole lie at the corners of a regular pentagon, the poles will make what in effect might be called a five-sided teepee, and the elements 13 will form a pentagon.

Looking now at the encircled joint in FIGURE 1, we see that there are five poles connected at this joint. These five poles are also numbered in FIGURE 1, as 1, 2, 3, 4 and 5, respectively, corresponding to the similar numbers in FIGURE 12. It will be noted, however, that the angularity in FIGURES 15 and 16 between poles numbers 1 and 4 is 90° in the plane of these two poles so that the plan of FIGURE 12, which shows a pentagon, is not reproduced in FIGURE 16, which is a similar view. In FIGURES 15 and 16, however, as in FIGURE 12, each pole 1, 2, 3, 4, 5 lies at exactly a 60° angle to the adjacent pole on each side, to which it is connected by an element 13 from which we see the desirability of the radially extending grooves 19 and the engaging lug or projection 20 on each element 13.

FIGURES 15 and 16 show an additional element 21 which is a gusset plate having downturned lugs 22, 22', each having an aperture (or a notch similar to notch 16 in FIGURE 6) to receive a bolt 12 of poles 1 and 4, respectively, in this view. Such an element 21 overlies both the elements 13 which are secured to poles 1 and 4. That is, on pole 1 lug 22 overlies the end of element 13 that overlies pole 1's element 13 and on pole 4 lug 22' overlies the end of element 13 from pole 3 which overlies pole 4's element 13.

Such an element 21, 22, 22' would be highly desirable where the grooves 19 and lug 20 were not provided, or in situations where the structure is to be subjected to unusually heavy stresses.

Figure 3:
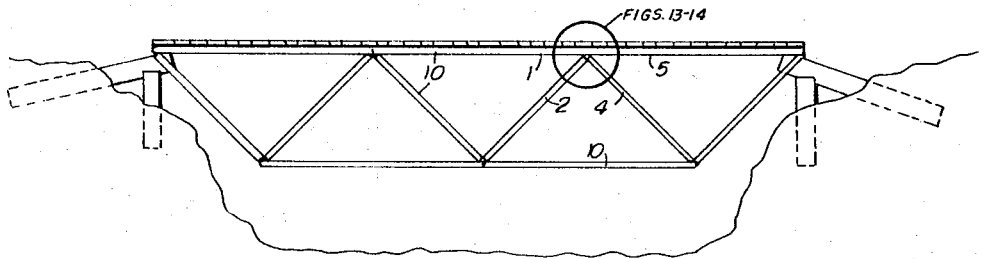
FIGURE 3 is an elevation of a bridge or the like structure formed in accordance with the present invention.
Figure 4:
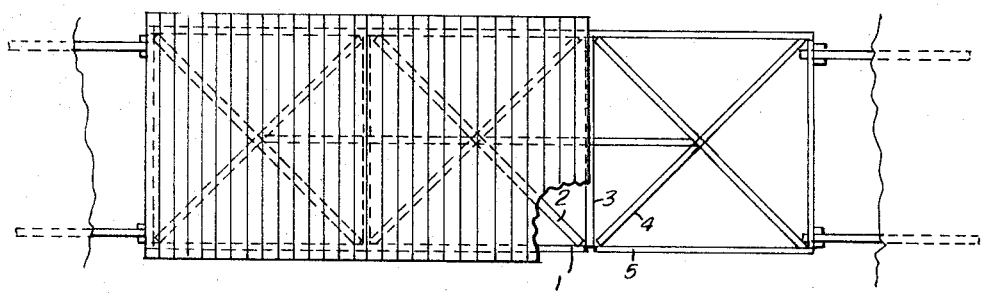
FIGURE 4 is a plan view of the bridge of FIGURE 3.
Figure 10:
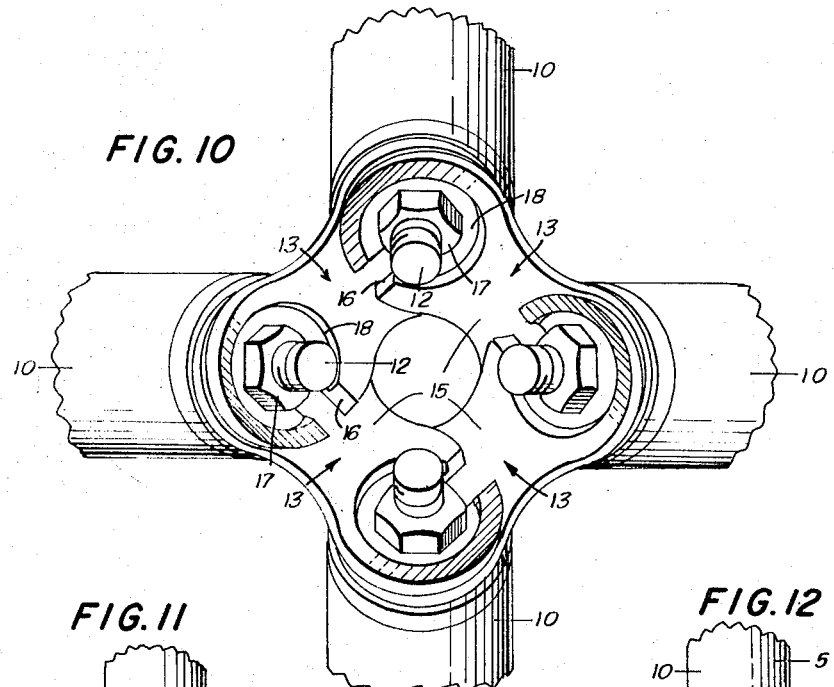
FIGURE 10 is a fragmentary view of a joint showing ends of four of the elements secured together.
Figure 13:
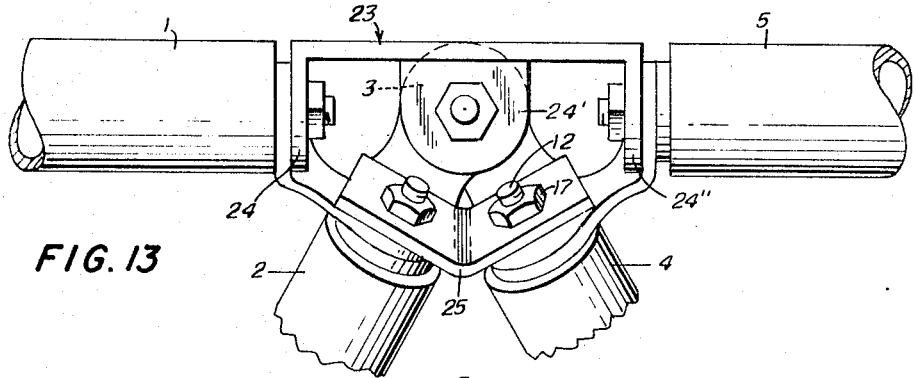
FIGURES 13 and 14 are an elevation and a plan, respectively, of the joint encircled in FIGURE 3.
Figure 14:
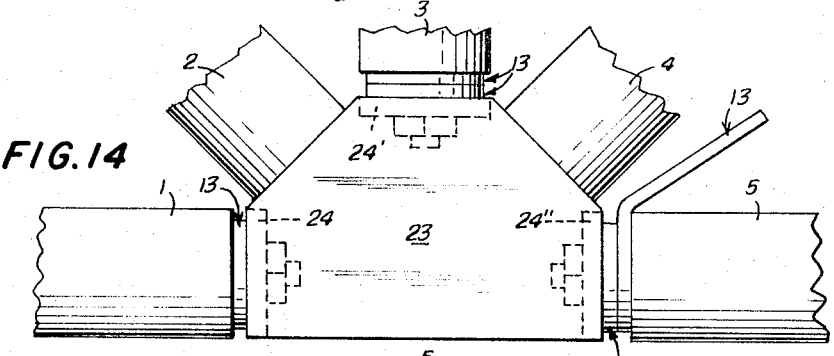

Referring now to FIGURES 13 and 14, taken with the joint encircled in FIGURES 3 and 4, we see that, here again, the joint is formed at the intersection of five poles, numbered 1, 2, 3, 4 and 5, which are connected together by element 13 in that order. In this joint, however, we will notice that pole 5 is not connected to pole 1 as it is in FIGURES 12, 15 and 16, so here the poles are connected in an open pattern. As seen in FIGURE 14, pole 1 is at 90° to pole 3, which in turn lies 90° to pole 5, and referring to FIGURE 4, it is at once apparent that poles 1 and 2, poles 2 and 3, poles 2 and 4, poles 3 and 4, and poles 4 and 5 lie at 60° with respect to each other. In the case of a bridge such as FIGURES 3 and 4, it is considered to be highly desirable to use a gusset plate 23 as seen in FIGURES 13 and 14. Gusset plate 23 has lugs 24, 24' and 24" to engage the bolts 12 of poles 1, 3 and 5. It is also considered desirable to use a reinforcing element 25 which is a small piece of plate "bent" through an obtuse angle of 120° to overlie both the elements 13 on poles numbered 2 and 4 to be sure that the poles 2 and 4 retain at all times their proper 60° position with respect to each other.

All of the joints shown in the drawings are made by use of identical elements 13 mounted on the ends of each pole 10 with or without the use of ancillary reinforcing elements 21, 23 or 25. In a few instances, such as in FIGURES 13 and 14, we notice that one element 13 while it remains assembled with the pole 5, is not used and may be reversed as shown in FIGURE 14 merely to get it out of the way.

The center joints of the lower chord of the bridge as shown in FIGURE 3 comprises the juncture of six poles 10, and preferably includes the use of two reinforcing elements 25. Each of the poles 10 in this case is secured by its element 13 to an adjacent pole in what, if the poles were laid flat on the ground, would be a regular hexagon. If the poles in FIGURE 3 are numbered 1, 2, 3, 4, 5 and 6, the poles 5 and 6 in that view will, of course, be invisible as lying behind poles 3 and 2, respectively. Poles 2 and 6, and poles 3 and 5, each lie at 60° to each other as well as to the pole adjacent to it on each side. Since pole 2 is secured to pole 3, and pole 5 is secured to pole 6 also at 60° by use of their element 13, it is desirable to use the reinforcing elements 25 to connect the bolt 12 of poles 2 and 6 and the bolts 12 of poles 3 and 5 together (at 60° to each other) to provide maximum strength for this joint.

Figure 2:
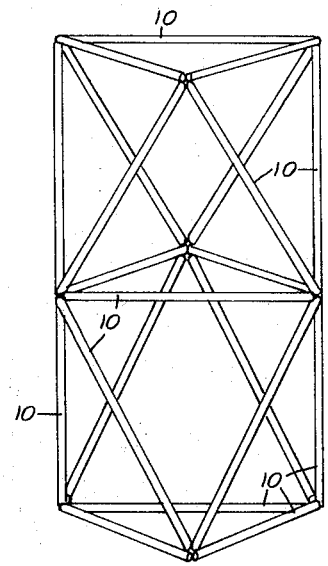
FIGURE 2 is a perspective view of a three-cornered tower formed in accordance with the present invention.
Figure 11:
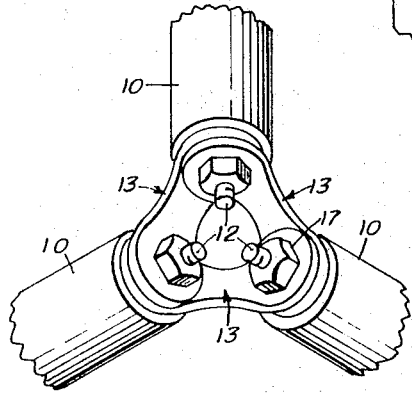
FIGURES 11 and 12 are diagrammatic showings, respectively, of the securement of three and of five elements together.

FIGURE 4 is clearly what would be seen looking downward on the apex of the framework shown in FIGURE 1. FIGURE 11 is what would be seen if poles were joined to each corner of the upper triangle of the tower seen in FIGURE 2 and joined at their upper ends to form an apex. FIGURE 12 is a view that would be seen if the frame were of pentagonal configuration having five poles extending upwardly from the corners of the pentagon to form a peak.

From the above explanation, it will be seen that many frames may be made using poles according to the present invention and assembling them in various ways.

Figure 9:
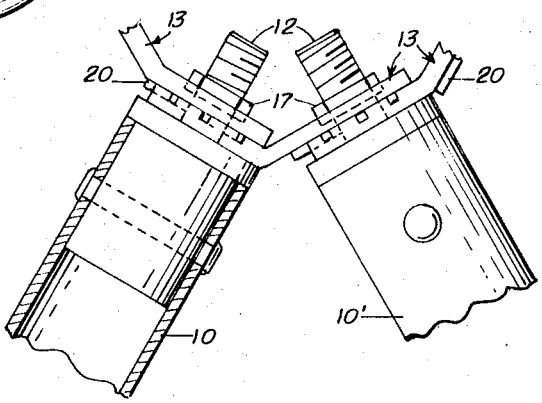
FIGURE 9 is a view similar to FIGURE 5 partly in section showing an all-metal structure of a pole element.

FIGURE 9 illustrates that the poles may be of metallic tubing and the structure of the poles per se is not germane to the issue of patentability presented herein.

Many other structures may be made with these devices than are illustrated in the attached drawings, it being possible with the above-described poles and fittings to make assemblies that do not require the joining of more than 18 poles at one point, which is the maximum number of poles which can converge at a point, each pole lying at an angle of 60° from adjacent poles. The joining of 18 poles at a single point will, of course, require several of the elements 25 to give maximum strength to the assembly.

The bolts 12 may be of other than the threaded type and may, for instance, be of the type in which the bolt is slotted to receive a wedge to force a washer, in lieu of nut 17, against the surface 18 of element 13. The word "bolt" as used herein refers to any known securing means of the "bolt" type to secure elements 13 and/or fittings 21, 23 or 25 in place as described above.

Having thus described my invention, I therefore claim:

1. A framework in which identical structural elements are interconnected at an angle of 60° with adjacent structural elements each said structural element including an elongated body, coaxial bolt means extending from each end of said elongated body, and securing elements mounted one on each of said coaxial bolt means; retaining and tightening means on each of said bolts to retain said securing elements in position thereon, said securing elements each presenting an apertured planar surface lying at an obtuse angle of 120° from the elongated body of said element, the aperture in said apertured planar surface receiving the coaxial bolt means of an identical structural element, whereby said identical structural elements are bolted together at an angle of 60° to each other and in which five such identical structural elements are secured together in a closed pattern two of said elongated elements lying at an angle of 90° to each other, and a gusset plate lying generally in the plane of the said two of said identical structural elements, said gusset plate including means engaged by the coaxial bolt means and their corresponding retaining and tightening means, whereby said two of said identical structural elements are held securely in 90° relationship to each other.

2. A framework in which identical structural elements are interconnected at an angle of 60° with adjacent structural elements each said structural element including an elongated body, coaxial bolt means extending from each end of said elongated body, and securing elements mounted one on each of said coaxial bolt means; retaining and tightening means on each of said bolts to retain said securing elements in position thereon, said securing elements each presenting an apertured planar surface lying at an obtuse angle of 120° measured from the elongated body of said element, the aperture in said apertured planar surface receiving the coaxial bolt means of an identical structural element, whereby said identical structural elements are bolted together at an angle of 60° to each other and in which five such identical structural elements are secured together in a closed pattern—three of said identical structural elements lying in a common plane.

3. The framework of claim 2 in which a gusset plate is provided lying generally in the plane of said three said identical structural elements and adapted to be secured to each of the coaxial securing means of said three said identical structural elements to hold said three pole elements in said common plane.

4. The framework of claim 2 in which tthe two of said five identical structural elements that do not lie in said common plane are secured together by a reinforcing plate-like element presenting apertured faces toward said two identical structural elements, the apertures of each said face receiving the coaxial bolt means of one of said two of said identical structural elements, said apertures extending at 90° to said surfaces and at 60° to each other.

5. A structural element to be used in forming frames, trusses, towers or the like, said structural element comprising an elongated pole, a coaxial bolt means extending from each end of said elongated pole, and two identical securing elements each having two planar ends, one of said securing elements being mounted on each of said bolt means, the first end of each said securing elements presenting a flat surface to the end of said elongated pole and having a first locking surface away from said pole and having a first aperture therethrough, through which said bolt means extends, and the second planar end presenting a second locking surface having a second aperture therethrough adapted to receive the coaxial bolt means of an identical structural element to bring the second locking surface of the securing element of said identical structural element into locking engagement with said first locking surface, said apertures arranged at a 60° angle with each other, the apex of said angle lying beyond the end of said bolt means and in which one end of each of said securing elements is provided with a lug on one of said surfaces adjacent the aperture therein, and a plurality of radially arranged depressions are arranged about the aperture on the other end of said securing elements, said lug and said depressions being so located as to interlock when the securing element of one pole element is superimposed over the securing element of another pole element the plurality of depressions being arranged so that the superimposed securing elements may be locked in selected angular positions with respect to each other.

6. A structural means comprising an elongated member, coaxial bolt means extending from each end of said elongated member, two identical connecting elements one on each end of said elongated member, each said connecting element comprising a first and second flat, plate-like wing portion, said first and second portions being joined together to present flat faces disposed in a V having an included angle of 120° between said flat faces, a first aperture in said first plate-like wing portion, a second aperture in said second plate-like wing portion, each said aperture having an axis normal to the surface of said wing portion of said V and intersecting each other at an angle of 60 degrees, complementary lock means associated with each aperture of said connecting elements, the lock means associated with said first apertures being located upon a first face of said wing portions and the lock means associated with said second apertures being located on an opposite face of said other wing portion, said connecting elements being each mounted at said first apertures on one of the said coaxial bolt means in a manner such that the intersection of the axis of said first and second said apertures lies beyond the end of said bolt means, whereby a plurality of the structural means may be joined selectively together to form a selected framework.

7. The structural means of claim 6 wherein one of said complementary lock means comprises a lug, and the other of said complementary lock means comprises a plurality of radially arranged depressions, said lug and said depressions being so located as to interlock when the securing element of one pole element is superimposed over the securing element of another pole element the plurality of depressions being arranged so that the superimposed securing elements may be locked in selected angular positions with respect to each othter.

References Cited

UNITED STATES PATENTS

| 435,156 | 8/1890 | Schmemann | 287—54 X |
| 2,954,250 | 9/1960 | Wing | 287—189.36 X |
| 2,982,572 | 5/1961 | Farber | 287—189.36 X |
| 3,118,694 | 1/1964 | Bernard | 287—189.36 X |

FOREIGN PATENTS

| 566,865 | 5/1958 | Belgium. |
| 416,639 | 10/1910 | France. |
| 874,657 | 4/1953 | Germany. |
| 838,537 | 6/1960 | Great Britain. |
| 356,920 | 2/1938 | Italy. |

FRANK L. ABBOTT, *Primary Examiner.*

R. S. VERMUT, *Assistant Examiner.*